US010012523B2

(12) United States Patent
Kolahi et al.

(10) Patent No.: US 10,012,523 B2
(45) Date of Patent: Jul. 3, 2018

(54) METHOD FOR OPERATING A CORIOLIS MASS FLOWMETER AND ASSOCIATED CORIOLIS MASS FLOWMETER

(71) Applicant: KROHNE Messtechnik GmbH, Duisburg (DE)

(72) Inventors: Kourosh Kolahi, Duisburg (DE); Ralf Storm, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 53 days.

(21) Appl. No.: 15/410,287

(22) Filed: Jan. 19, 2017

(65) Prior Publication Data

US 2017/0205264 A1 Jul. 20, 2017

(30) Foreign Application Priority Data

Jan. 20, 2016 (DE) .......... 10 2016 100 951

(51) Int. Cl.
*G01F 1/84* (2006.01)

(52) U.S. Cl.
CPC .......... *G01F 1/849* (2013.01); *G01F 1/8413* (2013.01); *G01F 1/8436* (2013.01)

(58) Field of Classification Search
CPC .......................................................... G01F 1/84
See application file for complete search history.

(56) References Cited

U.S. PATENT DOCUMENTS

| | | | | |
|---|---|---|---|---|
| 4,984,472 A * | 1/1991 | Dahlin | .......... | G01F 1/8422 73/861.356 |
| 5,488,870 A * | 2/1996 | Yoshimura | .......... | G01F 1/8409 73/861.355 |
| 7,406,878 B2 * | 8/2008 | Rieder | .......... | G01F 1/74 73/861.355 |
| 7,562,586 B2 * | 7/2009 | Rieder | .......... | G01F 1/8413 73/861.357 |
| 7,730,792 B2 | 6/2010 | Kassubek et al. | | |
| 9,372,107 B2 | 6/2016 | Kirst et al. | | |
| 9,429,458 B2 | 8/2016 | Hussain et al. | | |
| 9,557,205 B2 * | 1/2017 | Sanders | .......... | G01F 23/02 |

FOREIGN PATENT DOCUMENTS

| | | |
|---|---|---|
| WO | 2009/014447 A1 | 1/2009 |
| WO | 2016/003447 A1 | 1/2016 |

* cited by examiner

*Primary Examiner* — Jewel V Dowtin
(74) *Attorney, Agent, or Firm* — David S. Safran

(57) ABSTRACT

A method for operating a Coriolis mass flowmeter having at least one measuring tube, at least one oscillation generator, at least one oscillation sensor and at least one strain sensor. The oscillation generator is actuated with an oscillation excitation signal and the measuring tube is excited to oscillation by the oscillation generator, the oscillation of the measuring tube is detected by the oscillation sensor and an oscillation sensor signal is generated. The strain sensor is mechanically coupled to the measuring tube via a connection. A change of the mechanical coupling via the connection can be determined by the oscillation of the measuring tube being measured by the strain sensor and a strain sensor signal generated representing oscillation of the measuring tube, a correlation between the strain sensor signal and an oscillation signal representing the oscillation of the measuring tube is identified, and a temporal change of the correlation is determined.

12 Claims, 1 Drawing Sheet

METHOD FOR OPERATING A CORIOLIS MASS FLOWMETER AND ASSOCIATED CORIOLIS MASS FLOWMETER

BACKGROUND OF THE INVENTION

Field of the Invention

The invention relates to a method for operating a Coriolis mass flowmeter having at least one measuring tube, at least one oscillation generator, at least one oscillation sensor and at least one strain sensor, wherein the oscillation generator is actuated with an oscillation excitation signal and the measuring tube is excited to oscillation by the oscillation generator, wherein the oscillation of the measuring tube is detected by the oscillation sensor and an oscillation sensor signal is generated, and wherein the strain sensor is mechanically coupled to the measuring tube via a connection.

Description of Related Art

Furthermore, the invention relates to a Coriolis mass flowmeter having at least one measuring tube, at least one oscillation generator, at least one oscillation sensor, at least one strain sensor and an evaluation unit, wherein the oscillation generator is designed to excite the measuring tube to oscillation, wherein the oscillation sensor is designed to detect the oscillation of the measuring tube and to generate an oscillation sensor signal, wherein the strain sensor is mechanically coupled to the measuring tube via a connection and wherein the evaluation unit is designed to generate an oscillation excitation signal and to actuate the oscillation generator with the oscillation excitation signal.

The functional principle of the Coriolis mass flowmeter is that the measuring tube having medium flowing through it is excited to oscillation by the oscillation generator, wherein the direction of oscillation of the measuring tube, and thus also the medium flowing in the measuring tube, has at least one component orthogonal to the direction of flow of the medium in the measuring tube. The orthogonal component of the oscillation of the medium flowing in the measuring tube evokes a Coriolis inertia force in the flowing medium that counteracts the orthogonal component of the oscillation. The Coriolis inertia force causes a phase difference to occur along the longitudinal axis of the measuring tube at two different locations on the measuring tube between the oscillations of the measuring tube, the phase difference being proportional to the mass flow of the medium through the measuring tube. The Coriolis mass flowmeter measures the phase difference and determines the mass flow of the medium from it.

The strain sensor is a sensor that measures the strain of its sensor body. In order for the strain sensor to measure a strain of the measuring tube, the sensor body has to be mechanically coupled to the measuring tube via the connection so that a strain of the measuring tube is transferred to the sensor body.

Generic Coriolis mass flowmeters are known from practice, in which the mechanical coupling is changed by the connections. The changes of the mechanical coupling via the connections can have different causes. Possible causes are aging or fatigue of the connections or external influences on the connections. The changes of the mechanical coupling via the connection causes the strain measured by the strain sensor to no longer correspond to the strain of the measuring tube and, consequently, the measuring strain is inflicted with error. It is not known from the prior art how the change of the mechanical coupling is determined.

SUMMARY OF THE INVENTION

The object of the present invention is, thus, to provide a method for operating a Coriolis mass flowmeter as well as a Coriolis mass flowmeter that overcomes the disadvantage observed in the prior art.

According to a first teaching, the invention relates to a method, in which the above derived and described object is achieved. The method according to the invention is initially and essentially wherein the oscillation of the measuring tube is measured by the strain sensor and a strain sensor signal representing the oscillation of the measuring tube is generated, that a correlation between the strain sensor signal and an oscillation signal representing the oscillation of the measuring tube is identified and that a temporal change of the correlation is determined.

The correlation describes the relation between the strain sensor signal and the oscillation signal and is a measure for the strength of the correlation.

The cause of the temporal change of the correlation is, at otherwise same conditions, a change of the mechanical coupling via the connection. The temporal change of the correlation mirrors a change of the strain sensor signal relative to the oscillation signal.

One implementation of the method according to the invention provides that the correlation is compared to a reference correlation and an exceedance or shortfall of the reference correlation is signaled.

A further implementation of the method provides that the oscillation of the measuring tube is measured by the strain sensor using undersampling. Preferably, the bandwidth of the oscillation is limited by a band-pass filter so that no aliasing occurs.

A further implementation of the method provides that a decrease of the correlation with the passing of time is associated with a decrease in the mechanical coupling via the connection. The implementation is based on the mechanical coupling via the connection mostly decreasing over time because, for example, the connection becomes loose. The decrease of the mechanical coupling via the connection causes a reduced transfer of strain of the measuring tube onto the strain sensor, whereby the strain sensor signal is reduced in relation to the oscillation signal. The implementation simplifies the method according to the invention in that only one decrease of the mechanical coupling of the connection is taken into account.

Further implementations of the method provide that the oscillation sensor signal and the oscillation generator signal are used as oscillation signal or that the oscillation sensor signal or the oscillation generator signal are used as oscillation signal. The use of the oscillation sensor signal and/or the oscillation generator signal as oscillation signal is advantageous since it is already provided in generic Coriolis mass flowmeters.

A further implementation provides that the oscillation signal is generated such that it represents the speed of the oscillation of the measuring tube. The oscillation of the measuring tube can be associated with a deflection, a speed and an acceleration, as a function of time at every point on the measuring tube. Accordingly, an alternative to the implementation provides that the oscillation signal is generated such that it represents the deflection of the oscillation of the measuring tube. A further alternative to the implementation provides that it represents the acceleration of the oscillation of the measuring tube. In any case, it is then advantageous that the oscillation signal is generated in such a manner that it represents the speed of the measuring tube, if the used oscillation sensor directly generates an oscillation signal based on the implemented measuring principle and that the speed represents the oscillation.

A further implementation provides that the correlation is identified in that the transfer function between the oscillation signal and the strain sensor signal is determined. The coefficients of the transfer function are a measure for the strength of the relation between the oscillation signal and the strain sensor signal.

A further implementation provides that the correlation is identified in that a first amplitude of the oscillation of the measuring tube is determined from the strain sensor signal, that a second amplitude of the oscillation of the measuring tube is determined from the oscillation signal, that the first amplitude and the second amplitude are set in respect to one another and that the phase of the strain sensor signal is determined in respect to the oscillation signal. The relation between the first amplitude and the second amplitude and the phase are a measure for the strength of the correlation between the oscillation signal and the strain sensor signal.

Yet another implementation provides that mechanical tension arising in the measuring tube is measured by the strain sensor and the measured, mechanical tension produced is used to compensate for the effect of the mechanical tension on the oscillation sensor signal. Preferably, axial mechanical warping of the measuring tube is measured by the strain sensor. Accordingly, the oscillation of the measuring tube as well as the mechanical warping of the measuring tube is measured by the strain sensor.

Mechanical tension influences the oscillation of the measuring tube. The influenced oscillation of the measuring tube is detected by the oscillation sensor and the oscillation sensor generates an oscillation sensor signal representing the influenced oscillation, wherein the influencing of the oscillation from the oscillation sensor signal by the mechanical tension in the measuring tube is not noticeable. Thus a sensor that measures the mechanical tension in the measuring tube is needed for compensating the influence of the oscillation of the measuring tube by the mechanical tension. Presently, this is the strain sensor.

According to a second teaching, the invention relates to a Coriolis mass flowmeter in which the above derived and described object is achieved. The Coriolis mass flowmeter according to the invention is initially and essentially wherein the strain sensor is designed for measuring the oscillation of the measuring tube and for emitting a strain sensor signal representing the oscillation of the measuring tube and that the evaluation unit is designed for determining a correlation between the strain sensor signal and an oscillation signal representing the oscillation of the measuring tube and for determining a temporal change of the correlation.

The explanations for the method according to the invention hold true for the Coriolis mass flowmeter according to the invention and vice versa.

A design of the Coriolis mass flowmeter according to the invention provides that the evaluation unit and the strain sensor are designed for implementing a The method according to one of the above implementations and alternatives.

A further design of the Coriolis mass flowmeter provides that the strain sensor is arranged on the measuring tube via the connection. In a first alternative, it is provided that the measuring tube is preferably directly connected to a carrier and the strain sensor is arranged on the carrier via the connection. In a second alternative, it is provided that the measuring tube is preferably directly connected to a carrier and that at least two strain sensors are arranged, via the connection, on the body formed by the measuring tube and the carrier.

Another design provides that the connection is made using an adhesive bond, in particular by gluing. An alternative provides that the connection is made by force closure, in particular by screwing. The advantage of the connection by adhesive bond as opposed to the connection by force closure is that the connection is extensive and not point by point. The extensive connection creates a better transfer of a strain of the measuring tube onto the sensor body. The advantage of the connection by force closure as opposed to the connection by adhesive bond is the ability to disassemble the strain sensor.

A still further design provides that the strain sensor is a strain gauge. A strain gauge is, when it comes to electrical design, a resistor whose resistance is a function of the mechanical strain acting on the resistor body. Accordingly, the strain sensor signal represents the resistance.

In detail, there is a plurality of possibilities for designing and further developing the method according to the invention and the Coriolis mass flowmeter according to the invention as will be apparent from the following description of a preferred embodiment in conjunction with the accompanying drawings.

DETAILED DESCRIPTION OF THE INVENTION

Figure 1:
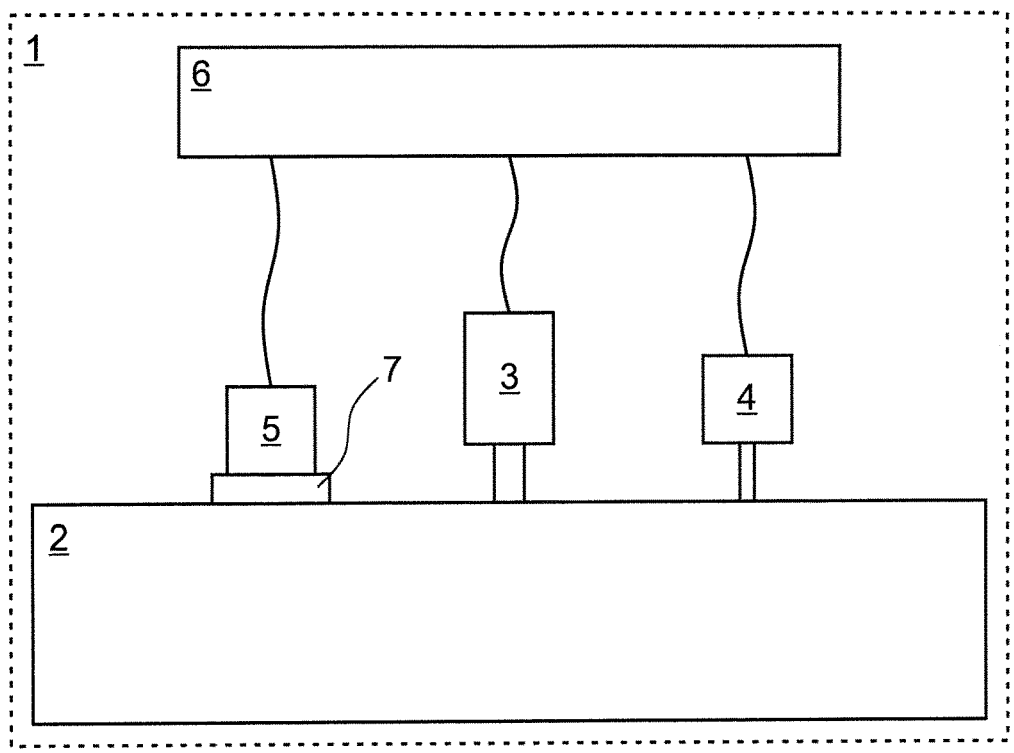
FIG. 1 schematically shows an embodiment of the Coriolis mass flowmeter according to the invention

FIG. 1 shows the embodiment of the Coriolis mass flowmeter 1 according to the invention in a schematic representation. It has a measuring tube 2, an oscillation generator 3, an oscillation sensor 4, a strain sensor 5 and an evaluation unit 6.

The strain sensor 5 is an electromagnetic speed sensor, and based on its measuring principle, directly generates an oscillation sensor signal that represents the speed of the oscillation of the measuring tube 2. The oscillation sensor signal is used by the evaluation unit 6 as the oscillation signal.

The strain sensor 5 is a strain gauge and is arranged on the measuring tube 2 via a connection 7 and, in this manner, is mechanically coupled to the measuring tube 2. The connection 7 is made by gluing. The strain sensor 5 is designed to measure both the oscillation of the measuring tube 2 as well as the mechanical tension occurring in the measuring tube 2 and to generate the oscillation as well as the resistance representing the mechanical tension as strain sensor signal.

Figure 2:
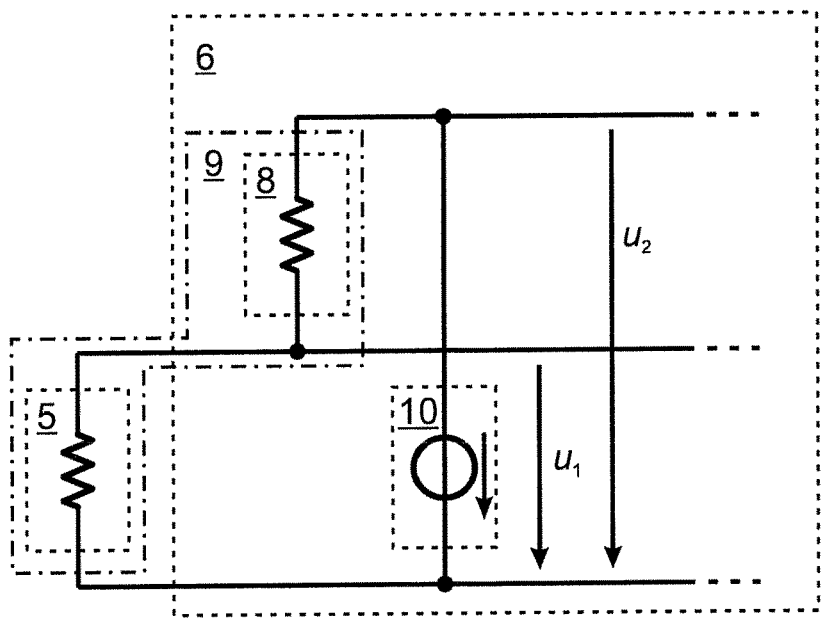
FIG. 2 is a diagram of the strain sensor and a section of the evaluation unit of the embodiment.

FIG. 2 shows the strain sensor 5 and a section of the evaluation unit 6. The strain sensor 5 and a resistor 8 of the evaluation unit 6 form a series connection 9. The series connection 9 is supplied by a voltage source 10 of the evaluation unit 6. The evaluation unit 6 is designed to measure the voltage $u_1$ via the strain sensor and the voltage $u_2$ via the series connection 9 and to determine the resistance, i.e. the strain sensor signal, of the strain sensor 5 from the two voltages $u_1$, $u_2$.

Furthermore, the evaluation unit 6 is designed for carrying out the following method steps:

Generating a harmonic oscillation generator signal and actuating the oscillation generator 3 with the oscillation generator signal, so that the measuring tube 3 is excited to oscillation.

Identifying a correlation between the temporal course of the strain sensor signal and the temporal course of the oscillation signal and determining the temporal change of the correlation.

In a first alternative, the identification is carried out by a first amplitude being determined from the temporal course of the strain sensor signal and a second amplitude being determined from the temporal course of the oscillation signal, the first amplitude and the second amplitude being set in relation to one another and the phase of the temporal course of the strain sensor signal determined in respect to the temporal course of the oscillation signal.

In a second alternative, the identification is carried out by a transfer function being determined between the temporal course of the strain sensor signal and the temporal course of the oscillation signal. The determination comprises the following method steps: Splitting the temporal course of the strain sensor signal into a direct component and an alternating component, phase-selective rectifying of the temporal course of the alternating component in respect to the temporal course of the oscillation signal and calculating the relatively complex change of the temporal course of the strain sensor signal in respect to the temporal course of the oscillation signal. The complex transfer function formed in this manner is a measure for the correlation. The greater the real portion of the transfer function in respect to the imaginary portion of the transfer function, the higher the correlation.

Phase-selective rectification of the temporal course of the alternating signal in respect to the temporal course of the oscillation signal means that a constant phase difference exists between the temporal course of the alternating signal and the temporal course of the oscillation signal. Preferably, the phase difference is 45° since, at this phase difference, the calculating effort for determining the correlation is reduced.

What is claimed is:

1. A method for operating a Coriolis mass flowmeter comprising:
   at least one measuring tube,
   at least one oscillation generator,
   at least one oscillation sensor and
   at least one strain sensor,
   wherein the oscillation generator is actuated with an oscillation excitation signal and the measuring tube is excited to oscillation by the oscillation generator,
   wherein the oscillation of the measuring tube is detected by the at least one oscillation sensor and an oscillation sensor signal is generated,
   wherein the strain sensor is mechanically coupled to the measuring tube via a connection,
   wherein oscillation of the measuring tube is measured by the at least one strain sensor and a strain sensor signal is generated representing the oscillation of the measuring tube,
   wherein a correlation between the strain sensor signal and an oscillation signal representing the oscillation of the measuring tube is identified, and
   wherein a temporal change of the correlation is determined.

2. The method according to claim 1, wherein a decrease of the correlation with the passing of time is associated with a decrease in mechanical coupling via the connection.

3. The method according to claim 1, wherein at least one of the oscillation sensor signal and the oscillation excitation signal is used as the oscillation signal.

4. The method according to claim 1, wherein the oscillation signal is generated in a manner representative the speed of the oscillation of the measuring tube.

5. The method according to claim 1, wherein the correlation is identified by a transfer function between the oscillation signal and the strain sensor signal being determined.

6. The method according to claim 1, wherein the correlation is identified by a first amplitude of the oscillation of the measuring tube being determined from the strain sensor signal, a second amplitude of the oscillation of the measuring tube being determined from the oscillation signal, by the first amplitude and the second amplitude being set in relation to one another and a phase of the strain signal being determined in respect to the oscillation signal.

7. The method according to claim 1, wherein mechanical strains arising in the measuring tube are measured by the strain sensor and the measured mechanical strains are used for compensating for any effect of the mechanical strains on the oscillation sensor signals.

8. A Coriolis mass flowmeter comprising:
   at least one measuring tube,
   at least one oscillation generator,
   at least one oscillation sensor,
   at least one strain sensor, and
   an evaluation unit,
   wherein the at least one oscillation generator is positioned so as to be able to excite the measuring tube to oscillation,
   wherein the at least one oscillation sensor positioned so as to be able to detect oscillation of the measuring tube and to generate an oscillation sensor signal,
   wherein the at least one strain sensor is mechanically coupled to the at least one measuring tube via a connection,
   wherein the evaluation unit is adapted to generate an oscillation excitation signal and to actuate the oscillation generator with the oscillation excitation signal,
   wherein the at least one strain sensor is adapted to measure oscillation of the measuring tube and to emit a strain sensor signal representing the oscillation of the measuring tube, and
   wherein the evaluation unit is adapted to identify a correlation between the strain sensor signal and an oscillation signal representing the oscillation of the measuring tube and to determine a temporal change of the correlation.

9. The Coriolis mass flowmeter according to claim 8, wherein the evaluation unit is adapted to associate a decrease of the correlation with the passing of time with a decrease in the mechanical coupling via the connection.

10. The Coriolis mass flowmeter according to claim 8, wherein the strain sensor is arranged on the measuring tube via the connection.

11. The Coriolis mass flowmeter according to claim 9, wherein the connection comprises an adhesive bond.

12. The Coriolis mass flowmeter according to claim 8, wherein the strain sensor is a strain gauge.

* * * * *